(12) United States Patent
Mossberg et al.

(10) Patent No.: US 10,821,677 B2
(45) Date of Patent: Nov. 3, 2020

(54) SEALING DEVICE AND A METHOD FOR HEAT SEALING PACKAGING MATERIAL, AND A FILLING MACHINE

(71) Applicant: Tetra Laval Holdings & Finance S.A., Pully (CH)

(72) Inventors: Ulf Mossberg, Löddeköpinge (SE); Göran Hermodsson, Staffanstorp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 164 days.

(21) Appl. No.: 16/072,369

(22) PCT Filed: Jan. 19, 2017

(86) PCT No.: PCT/EP2017/051037
§ 371 (c)(1),
(2) Date: Jul. 24, 2018

(87) PCT Pub. No.: WO2017/129463
PCT Pub. Date: Aug. 3, 2017

(65) Prior Publication Data
US 2019/0030826 A1 Jan. 31, 2019

(30) Foreign Application Priority Data
Jan. 25, 2016 (SE) ...................................... 1650084

(51) Int. Cl.
*B29C 65/32* (2006.01)
*B29C 65/00* (2006.01)
(Continued)

(52) U.S. Cl.
CPC .............. *B29C 65/32* (2013.01); *B29C 65/18* (2013.01); *B29C 65/3656* (2013.01);
(Continued)

(58) Field of Classification Search
CPC ..... B29C 65/32; B29C 65/18; B29C 65/3656; B29C 65/4312; B29C 65/8221;
(Continued)

(56) References Cited

U.S. PATENT DOCUMENTS 2,305,010 A 12/1942 Kenney et al.
2,509,439 A 5/1950 Langer
(Continued)

FOREIGN PATENT DOCUMENTS

DE 27 43 315 A1 4/1979
DE 86 15 381 U1 9/1989
(Continued)

OTHER PUBLICATIONS

International Search Report and Written Opinion from corresponding PCT Application No. PCT/EP2017/051037 dated Mar. 28, 2017 (3 pages).
(Continued)

*Primary Examiner* — Gloria R Weeks
*Assistant Examiner* — Jacob A Smith
(74) *Attorney, Agent, or Firm* — Finnegan, Henderson, Farabow, Garrett & Dunner LLP

(57) ABSTRACT

The invention relates to a sealing device (100) and a method for heat sealing packaging material for producing sealed packages. The invention also relates to a filling machine. The sealing device (100) comprises a first jaw (110) comprising an electromagnet (112), and a second jaw (120) comprising a magnetic element (122). The second jaw (120) is arranged opposite to the first jaw (110) to form a gap adapted to receive the packaging material, such that the first jaw (110) and the second jaw (120) are attracted to each other upon actuation of the electromagnet (112) to close the gap and clamp the packaging material between the first jaw (110) and the second jaw (120).

14 Claims, 4 Drawing Sheets

(51) Int. Cl.
*B29C 65/36* (2006.01)
*B65B 51/22* (2006.01)
*B65B 51/30* (2006.01)
*B29C 65/18* (2006.01)

(52) U.S. Cl.
CPC ...... *B29C 66/4312* (2013.01); *B29C 66/8221* (2013.01); *B29C 66/8244* (2013.01); *B29C 66/849* (2013.01); *B65B 51/227* (2013.01); *B65B 51/303* (2013.01); *B29C 66/1122* (2013.01); *B29C 66/8322* (2013.01); *B29C 66/8324* (2013.01); *B29C 66/83541* (2013.01)

(58) Field of Classification Search
CPC .............. B29C 65/8244; B29C 65/849; B29C 66/1122; B29C 66/8322; B29C 66/8324; B29C 66/83541; B65B 51/227; B65B 51/303; B65B 51/10; B65B 51/26; B65B 51/28; B65B 51/30
USPC ....... 53/375.9, 376.6, 377.7, 373.7; 156/580, 156/583.1, 583.7
See application file for complete search history.

(56) References Cited

U.S. PATENT DOCUMENTS

| | | | | |
|---|---|---|---|---|
| 2,982,334 A * | 5/1961 | Cooper | ............... | B29C 66/8322 100/305 |
| 4,082,941 A | 4/1978 | Sukow et al. | | |
| 4,333,300 A * | 6/1982 | Russell | ................... | B43M 7/00 414/412 |
| 4,478,659 A | 10/1984 | Hall | | |
| 4,501,109 A * | 2/1985 | Monsees | ............... | B65B 9/2028 226/35 |
| 4,650,535 A * | 3/1987 | Bennett | ............... | B29C 66/8161 156/352 |
| 4,743,337 A * | 5/1988 | Moran | ................... | B29C 65/18 100/219 |
| 4,986,804 A * | 1/1991 | Jensen | ................... | B29C 66/80 156/583.1 |
| 6,065,272 A * | 5/2000 | Lecomte | ............. | B65B 67/1277 53/576 |
| 7,328,544 B2 * | 2/2008 | Yokota | ................... | B65B 9/207 53/167 |
| 9,174,754 B2 * | 11/2015 | Palmquist | ........... | B29C 65/3656 |
| 2003/0221773 A1 * | 12/2003 | Jones | ................ | B29C 66/24221 156/272.2 |
| 2003/0226631 A1 * | 12/2003 | Sterud | ............... | B29C 66/91951 156/64 |
| 2005/0172736 A1 * | 8/2005 | Kumagai | ............... | G01B 21/08 73/865.8 |
| 2006/0064945 A1 * | 3/2006 | Kammler | ............... | B29C 66/934 53/479 |
| 2007/0017189 A1 * | 1/2007 | Konno | ................... | B65B 51/22 53/551 |
| 2011/0167763 A1 * | 7/2011 | Waldherr | .......... | B29C 66/92451 53/371.8 |
| 2012/0151875 A1 * | 6/2012 | Capriotti | ................ | B65B 65/00 53/285 |
| 2012/0159901 A1 * | 6/2012 | Capriotti | ........... | B29C 66/24244 53/285 |
| 2012/0297735 A1 * | 11/2012 | Allen | .................... | B29C 44/468 53/450 |
| 2014/0220791 A1 * | 8/2014 | Baker | .................... | H01R 39/64 439/32 |
| 2016/0031574 A1 * | 2/2016 | Razzaboni | ................ | B65B 7/02 53/268 |
| 2018/0312284 A1 * | 11/2018 | Ternes | .................... | B65B 9/087 |
| 2018/0326626 A1 * | 11/2018 | Gray | .................... | B31D 5/0078 |

FOREIGN PATENT DOCUMENTS

| | | |
|---|---|---|
| JP | S58-212914 A | 12/1983 |
| WO | WO 88-02334 A1 | 4/1988 |
| WO | WO-2007-094662 A1 | 8/2007 |
| WO | WO-2015158502 A1 * | 10/2015 ........... B29C 65/368 |

OTHER PUBLICATIONS

Office Action from corresponding Swedish Application No. 1650084-5 dated Aug. 11, 2016 (7 pages).

* cited by examiner

SEALING DEVICE AND A METHOD FOR HEAT SEALING PACKAGING MATERIAL, AND A FILLING MACHINE

CROSS-REFERENCE TO RELATED PATENT APPLICATIONS

This is a National Phase of International Application No. PCT/EP2017/051037, filed Jan. 19, 2017, which claims the benefit of Swedish Application No. 1650084-5 filed Jan. 25, 2016. The entire contents of the above-referenced applications are expressly incorporated herein by reference.

TECHNICAL FIELD

The invention relates to a sealing device and a method for heat sealing packaging material for producing sealed packages. The invention also relates to a filling machine.

BACKGROUND ART

In filling machines for liquid food packages, such as e.g. sold by Tetra Pak under the name Tetra Pak A1, a web of packaging material is sterilized, and is subsequently formed into a tube by making the longitudinal edges of the web overlap each other and sealing the overlap area. This tube is filled with liquid food continually, and the tube of packaging material is transversally sealed and cut such that separate packages with liquid food are formed.

The transversally seal procedure is typically carried out by a sealing device. The sealing device often comprises a first and a second jaw, wherein the portion of the tube subject to receive a transversal seal is arranged in between the first jaw and the second jaw during the formation of the seal. The first jaw is arranged to provide means for allowing the sealing device to press the packaging material of the tube during the formation of the seal, and the second jaw is arranged to provide sufficient heat to the packaging material of the tube needed for the formation of the seal.

In order for the first jaw to provide means enabling a sufficient applied pressure to the tube, an external force must be supplied to the first jaw. The problem with the prior art solutions is that the force application will result in pull forces in different parts of the transport system, resulting in the jaws of the sealing device experiencing tension, thus increasing the risk of mechanical failure.

SUMMARY OF THE INVENTION

It is an object of the present invention to mitigate, alleviate or eliminate one or more of the above-identified deficiencies in the art and disadvantages singly or in any combination and solve at least the above mentioned problem.

According to a first aspect, these and other objects are achieved in full, or at least in part, by a sealing device for heat sealing packaging material for producing sealed packages. The sealing device comprises a first jaw comprising an electromagnet, and a second jaw comprising a magnetic element. The second jaw is arranged opposite to the first jaw to form a gap adapted to receive the packaging material, such that the first jaw and the second jaw are attracted to each other upon actuation of the electromagnet to close the gap and clamp the packaging material between the first jaw and the second jaw.

This is advantageous as the force required in clamping the package material together is supplied by direct interaction between the first jaw and second jaw. Thus, the normal forces will not be transferred into the main frame of the packaging system to cause unwanted friction. This, in turn, will result in reduced pull forces on the transport system, which is beneficial as the jaws will experience less tension, thus increasing the durability and hence lifetime of the system.

The magnetic element of the second jaw may be constituted by a magnetic disc, but may also constitute other non-disk shaped objects.

In order to achieve less strain to the package material during clamping, the second jaw may comprise a housing and a shaft connected to the magnetic element, wherein the shaft is spring-loaded in relation to the housing.

The first jaw may be movable in relation to the second jaw, but alternatively, the second jaw may be movable in relation to the first jaw. Both jaws may be movable with respect to the frame of the filling machine to which the jaws are connected or attached, or alternatively the first jaw or the second jaw may be static with respect to the frame of the filling machine.

The first jaw or the second jaw may comprise an inductor device having a coil conductor, which interact with the packaging material.

The electromagnet may be provided with energy via inductive power transfer. Also the inductor device may be provided with energy via inductive power transfer. The inductive power transfer is advantageous as it enables power transfer to proceed uninterrupted without need to have an electrically conductive path between the power source and the electromagnet/inductor device at all times.

The magnetic element may be spherically suspended in said second jaw. The first jaw may comprise a first electromagnet and a second electromagnet, and said second jaw comprises a first magnetic element and a second magnetic element, said first electromagnet being aligned opposite to said first magnetic element and said second electromagnet being aligned opposite to said second magnetic element.

The first jaw may comprise a first electromagnet and a first magnetic element, and said second jaw comprises a second electromagnet and a second magnetic element, said first electromagnet being aligned opposite to said second magnetic element and said second electromagnet being aligned opposite to said first magnetic element.

According to a second aspect, the objects are achieved in full, or at least in part, by a filling machine for filling packages with a food product, comprising an induction sealing device as described above.

According to a third aspect, the objects are achieved in full, or at least in part, by a method for heat sealing packaging material to produce sealed packages, using an induction sealing device described above. The method comprises the first step of: actuating the electromagnet of the first jaw so that the first jaw and the second jaw attract each other to close the gap in-between them and clamp the packaging material. The method further comprises the steps of: actuating the inductor device to seal the packaging material, deactivating the inductor device, and deactivating the electromagnet to release the first jaw and the second jaw from each other.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise.

BRIEF DESCRIPTION OF THE DRAWINGS

The above objects, as well as additional objects, features and advantages of the present invention, will be more fully appreciated by reference to the following illustrative and non-limiting detailed description of preferred examples of the present invention, when taken in conjunction with the accompanying drawings, wherein.

DETAILED DESCRIPTION OF PREFERRED EXAMPLES OF THE INVENTION

Figure 1:
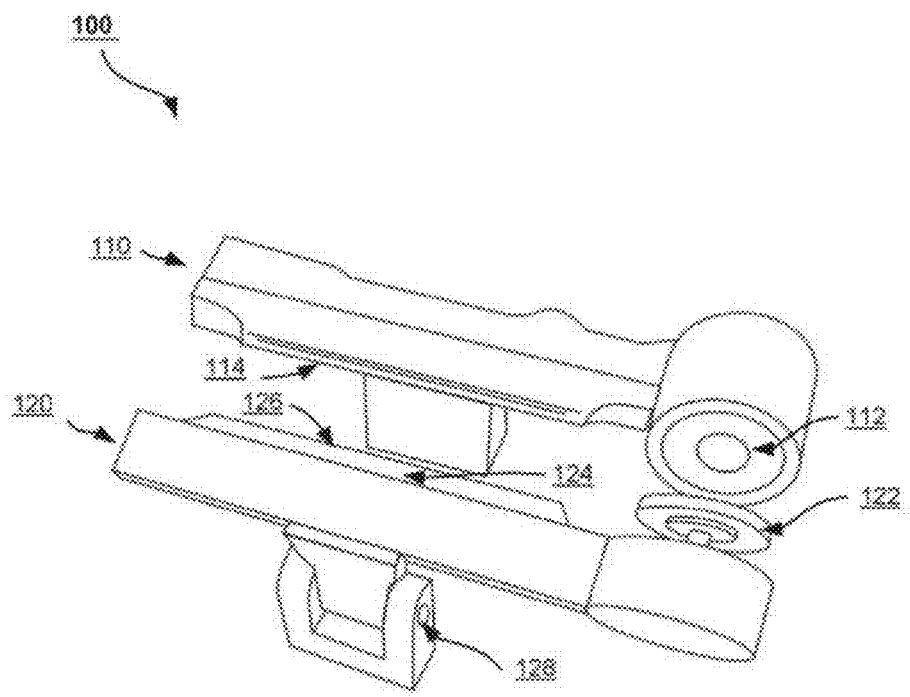
FIG. 1 is a schematic view of a sealing device according to one exemplary example of the disclosure.

FIG. 1 illustrates a sealing device 100 according to one example of the disclosure. The sealing device 100 comprises a first jaw 110 comprising an electromagnet 112 and a second jaw 120 comprising a magnetic element 122. The second jaw 120 is arranged opposite to the first jaw 110 to form a gap adapted to receive the packaging material. The first jaw 110 and the second jaw 120 are attracted to each other upon actuation of the electromagnet 112 to close the gap and clamp the packaging material between the first jaw 110 and the second jaw 120. The package material is compressed between the first and second sealing portions 114,126 of the jaws 110,120.

This way the closing and opening of the first jaw 110 and the second jaw 120 will be realised without letting the normal forces be transferred into the main frame to which the jaws 120,130 are mounted. Such a transfer of forces is a problem since it may risk causing friction between the moving and stationary parts of the transport system of the filling machine of which the sealing device 100 is a part. Increased friction results in increased pull forces in the transport system, which in turn results in higher mechanical stress to the jaw system causing shorter life-time of its components.

The second jaw 120 is movable with respect to the first jaw 110 by means of the second jaw 120 being rotatable using a hinged connection 128. Naturally, other alternatives are possible, such as e.g. that the first jaw is movable with respect to the second jaw, or both jaws 110,120 are movable with respect to its supporting frame. Naturally, this relative movement between the jaws 110,120 is not limited to an angular movement by means of a hinged connection 128, but could also be realised using for instance transversal movement of the first jaw 110 and/or second jaw 120 for instance in sliding grooves.

The magnetic element 122 of the second jaw 120 may be a magnetic disk. The material of the disk should be magnetic, but different materials may be used, such as for example ferromagnetic metals and alloys, ferromagnetic liquids.

The second jaw 120 comprises an inductor device 124 having a coil conductor which interacts with said packaging material. The purpose of the inductor device 124 is to heat the packaging material to a temperature sufficient to seal the material, the heating being realised by inducing loss currents in a metal layer part of the packaging material that is present between the jaws 110,120. This ensures a localized heating which melts the heat seal plastic material locally. Alternatively, the heating may be realised by inducing loss currents in the first sealing portion 114. This may be advantageous when using package materials without a metal layer.

In an alternative example, the second jaw 120 comprises the inductor device 124.

The power supplied to the inductor device 124 may be realised using inductive power transfer. Thus power may be transmitted without the need of establishing a physical conducting loop to the inductor device. The power supplied to the electromagnets may also be realised using inductive power transfer.

The magnetic element 122 may alternatively be spherically suspended in the second jaw 120.

Figure 2:
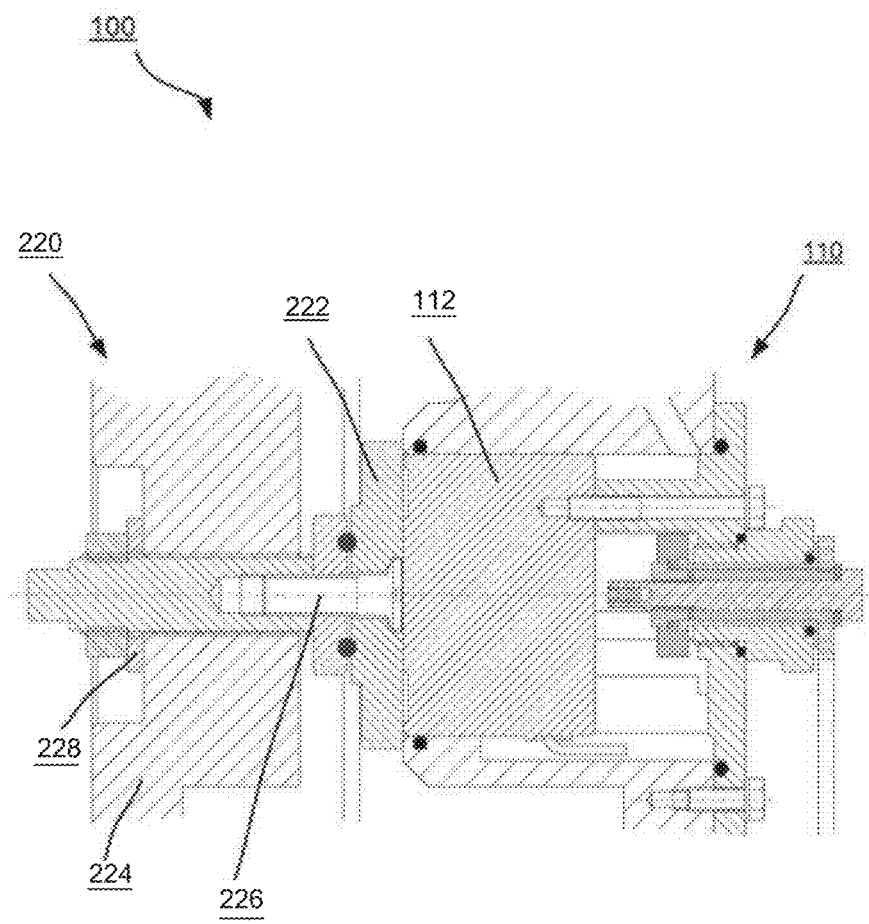
FIG. 2 is a drawing illustrating a side view of the example example of FIG. 1.

The actuation between the first and second jaw 110,120 will now be described in more detail with reference to FIG. 2 illustrating the side view of the example shown in FIG. 1. The second jaw 220 comprises a housing 224 and a shaft 226 connected to the magnetic element 222 wherein the shaft 226 is spring-loaded in relation to the housing 224. This is realised using a disk spring 228, but may also be realised for instance using other types of springs or elastic materials.

Figure 3:
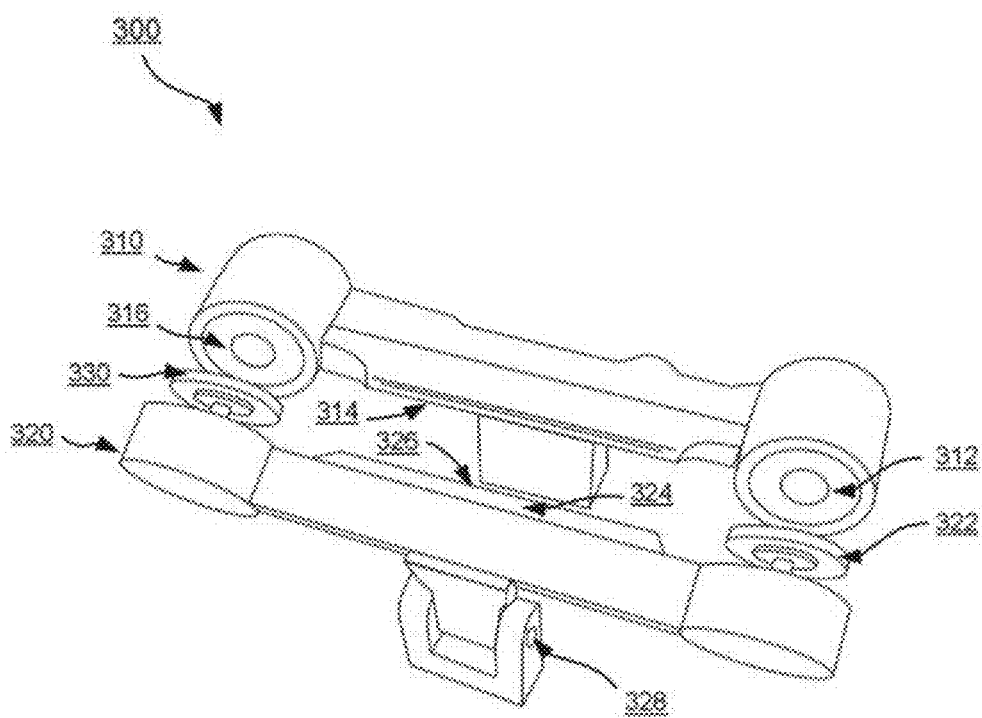
FIG. 3 is a schematic view of a sealing device according to another exemplary example of the disclosure.

FIG. 3 illustrates a sealing device 300 according to another example of the disclosure. In this example, attractive forces between the jaws 310,320 are created on both sides of the package material, this being realised using two electromagnets on either side of the sealing portions 314,326. The first jaw 310 comprises a first electromagnet 312 and a second electromagnet 316. The second jaw 320 comprises a first magnetic element 322 and a second magnetic element 330. The first electromagnet 312 is aligned opposite to the first magnetic element 322 and the second electromagnet 316 is aligned opposite to the second magnetic element 330.

Figure 4:
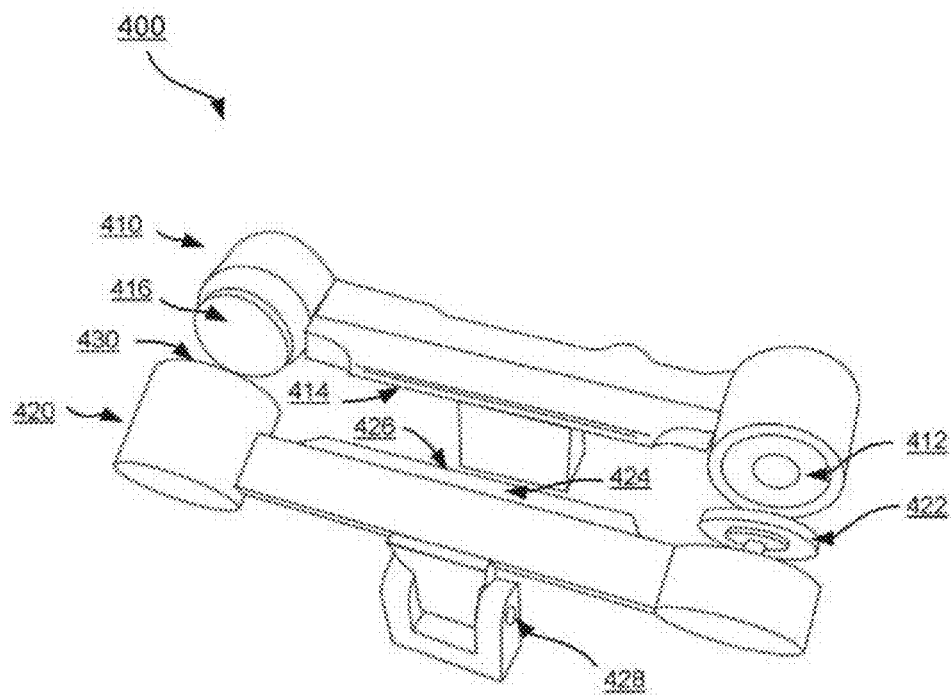
FIG. 4 is a schematic view of a sealing device according to yet another exemplary example of the disclosure.

FIG. 4 illustrates a sealing device 400 according to another example of the disclosure. The first jaw 410 comprises a first electromagnet 412 and a first magnetic element 416, and the second jaw 420 comprises a second electromagnet 430 and a second magnetic element 422. In this example the first electromagnet 412 is aligned opposite to said second magnetic element 422 and said second electromagnet 430 being aligned opposite to said first magnetic element 416.

An example of a method for heat sealing packaging material to produce sealed packages will now be described. The method comprises the use of a sealing device 100, the sealing device 100 comprising a first jaw 110 comprising an electromagnet 112 and a second jaw 120 comprising a magnetic element 122. The second jaw 120 is arranged opposite to the first jaw 110 to form a gap adapted to receive said packaging material. The second jaw 120 further comprises an inductor device 124. The method comprises the first step of: actuating the electromagnet 112 of the first jaw 110 so the first jaw 110 and the second jaw 120 attract each other to close the gap and clamp the packaging material. The method further comprises the second step of: actuating the inductor device 124 to seal the packaging material, deactivating the inductor device 124, and deactivating the electromagnet 112 to release the first jaw 110 and the second jaw 120 from each other.

It is understood that a sealing device according to the disclosure herein can be for instance an induction sealing device.

It is understood that other variations in the present invention are contemplated and in some instances, some features of the invention can be employed without a corresponding use of other features. Accordingly, it is appropriate that the appended claims be construed broadly in a manner consistent with the scope of the invention.

The invention claimed is:

1. A sealing device for heat-sealing packaging material when producing sealed packages formed of the packaging material, wherein the packaging material extends in a first direction, the sealing device comprising:
   a first jaw having a sealing portion and having an electromagnet, wherein the first jaw is located on a first side of the packaging material with respect to the first direction; and
   a second jaw having a second sealing portion and having a magnetic element configured to be magnetically coupled to the electromagnet of the first jaw, wherein the second jaw is located on a second side of the packaging material with respect to the first direction, wherein the second jaw is opposite of the first jaw with respect to the first direction, such that the second sealing portion and the first sealing portion and configured to form a gap therebetween for receiving the packaging material along the first direction,
   wherein the first jaw and the second jaw are attracted to each other upon actuation of the electromagnet to close the gap and clamp the packaging material between the first jaw and the second jaw, and
   wherein the second jaw includes a housing that at least partially houses a shaft connected to the magnetic element, the shaft being spring-loaded in relation to the housing, such that the spring biases the magnetic element toward the electromagnet.

2. The sealing device according to claim 1, wherein the magnetic element of the second jaw is a magnetic disc.

3. The sealing device according to claim 1, wherein the first jaw is movable in relation to the second jaw.

4. The sealing device according to claim 1, wherein the second jaw is movable in relation to the first jaw.

5. The sealing device according to claim 1, wherein at least one of the first jaw or the second jaw comprises an inductor device having a coil conductor which interacts with the packaging material by heating the packaging material during a sealing operation.

6. The sealing device according to claim 5, wherein the inductor device is actuated via inductive power transfer.

7. The sealing device according to claim 1, wherein the electromagnet is actuated via an inductive power transfer.

8. The sealing device according to claim 1, wherein the magnetic element has a spherical cross-sectional surface.

9. The sealing device according to claim 8, wherein the surface of the magnetic element is suspended in the second jaw in order to allow movement of the magnetic element towards the first jaw.

10. The sealing device according to claim 1, wherein at least one of the first jaw or the second jaw has a hinged connection, such that the at least one of the first jaw or the second jaw is configured to rotate about the hinged connection when closing the gap.

11. The sealing device according to claim 1, wherein the electromagnet of the first jaw is a first electromagnet and the first jaw further includes a second electromagnet, and wherein the magnetic element of the second jaw is a first magnetic element and the second jaw further includes a second magnetic element, wherein the first electromagnet is aligned opposite of the first magnetic element with respect to the first direction and the second electromagnet is aligned opposite of the second magnetic element with respect to the first direction.

12. The sealing device according to claim 1, wherein the first jaw further includes a first-jaw magnetic element and the second jaw further includes a second-jaw electromagnet, wherein the electromagnet of the first jaw is aligned opposite of the magnetic element of the second jaw with respect to the first direction and the second-jaw electromagnet is aligned opposite of the first-jaw magnetic element with respect to the first direction.

13. A filling machine for filling packages with a food product, comprising a sealing device according to claim 1.

14. A method for using a sealing device to heat-seal packaging material when producing sealed packages formed of the packaging material that extends in a first direction, wherein the sealing device includes an inductor device, a first jaw having an electromagnet, and a second jaw having a magnetic element, wherein the second jaw includes a housing that at least partially houses a shaft connected to the magnetic element, the shaft being spring-loaded in relation to the housing, such that the spring biases the magnetic element toward the electromagnet and wherein the second jaw is arranged opposite to the first jaw with respect to the first direction to thereby form a gap between the first jaw and the second jaw, such that the gap is configured to receive the packaging material during a sealing operation, the method comprising:
   actuating the electromagnet of the first jaw to thereby attract the first jaw and the second jaw toward each other and to thereby close the gap and clamp the packaging material between the first jaw and the second jaw;
   actuating the inductor device to seal the packaging material by heating the packaging material;
   deactivating the inductor device; and
   deactivating the electromagnet to release the first jaw and the second jaw from each other and to thereby open the gap between the first jaw and the second.

* * * * *